United States Patent [19]

Diab

[11] 4,145,570

[45] Mar. 20, 1979

[54] METHOD AND SYSTEM FOR 5-BIT ENCODING OF COMPLETE ARABIC-FARSI LANGUAGES

[76] Inventor: Khaled M. Diab, P.O. Box 13457, Orlando, Fla. 32809

[21] Appl. No.: 846,824

[22] Filed: Oct. 31, 1977

[51] Int. Cl.$^2$ .......................... B41J 5/00; H04L 3/00

[52] U.S. Cl. .......................................... 178/30; 400/111

[58] Field of Search ........................ 197/1 A; 364/900; 340/324 AD; 178/17.5, 26 R, 26 A, 30; 400/111, 109

[56] References Cited

U.S. PATENT DOCUMENTS

| | | | |
|---|---|---|---|
| 3,852,720 | 12/1974 | Park | 197/1 A X |
| 3,938,099 | 2/1976 | Hyder | 197/1 A X |
| 3,998,310 | 12/1976 | Chaudhry | 197/1 A |

*Primary Examiner*—Thomas A. Robinson
*Attorney, Agent, or Firm*—Burns, Doane, Swecker & Mathis

[57] ABSTRACT

A method and apparatus for coding, transmitting, receiving and displaying remotely or locally, all Arabic-Farsi characters or letters, basic arithmetic signs, numerals, punctuation marks and diacritical marks, as well as teleprinter operation commands in 5-bit standard Baudot codes. An Arabic-Farsi teleprinter similar in operation to the English teleprinter and compatible with the International exchange systems is provided without eliminating any letter forms. The teleprinter operation (the ability to compress the data into 5-bit characters) is based upon two basic criteria of the Arabic-Farsi languages, namely: (1) the form (start, middle, and or independent) of a character can be known if the preceding character and the following characters are known; and (2) there are six characters that are identical except for the presence or absence of a dot. The digital logic circuits make use of the above criteria to permit the encoding and decoding and thus the transmitting and receiving of complete Arabic-Farsi languages.

9 Claims, 10 Drawing Figures

5-BIT BINARY BAUDOT CODED ARABIC TELEPRINTER BLOCK DIAGRAM

ARABIC ADAPATER

AUTOMATIC CODING OF KEYS FOR LETTERS WITH DOT ABOVE

EXAMPLE OF ARABIC TELEPRINTER KEYBOARD

ENGLISH/ARABIC TELEPRINTER KEYBOARD EXAMPLE

FIG. 6

CLASSIFICATION OF TYPES OF
ARABIC FARCI TELEPRINTER CHARACTERS

| TYPE A | | | | TYPE B | | TYPE C | | | TYPE D | | TYPE O |
|---|---|---|---|---|---|---|---|---|---|---|---|
| ل | ق | خ | غ | د | لا | 1 | 8 | = | ~ | | WHO ARE YOU? |
| ط | ف | ش | ظ | ذ | ة | 2 | 9 | ، | ء | | BELL |
| ث | ع | س | ض | و | ى | 3 | 0 | ؛ | ـ | | CARRIAGE RETURN |
| ب | ك | ي | چ | ر | ء | 4 | − | | ,, | | SPACE |
| ت | ه | ن | | ز | | 5 | + | . | // | | LINE FEED |
| ص | ح | م | | ژ | | 6 | / | : | ـَ | | |
| ئ | ج | ع | | أ | | 7 | X | ؟ | ـُ | | |
| | | | | | | | | | ـِ | | |

FIG. 7

RULES FOR DETERMINING
THE LETTER FORM

| FORM | PRECEDING CHARACTER | FOLLOWING CHARACTER |
|---|---|---|
| START FORM | B + C + 0 | A + B |
| MIDDLE FORM | A | A + B |
| END FORM | A | C + 0 |
| INDEPENDENT FORM | B + C + 0 | C + 0 |

FIG. 8

EXAMPLE OF 5-BIT BINARY BAUDOT CODING OF ARABIC AS COMPARED TO ENGLISH CHARACTER CODING

| LATIN | | CODE BAUDOT | ARABIC | | No. |
|---|---|---|---|---|---|
| UPPER | LOWER | 54 321 | UPPER | LOWER | |
| 1 | Q | 10 111 | 1 | ل ل | 1 |
| 2 | W | 10 011 | 2 | لا ـلا | 2 |
| 3 | E | 00 001 | 3 | ط | 3 |
| 4 | R | 01 010 | 4 | د | 4 |
| 5 | T | 10 000 | 5 | و | 5 |
| 6 | Y | 10 101 | 6 | لـ | 6 |
| 7 | U | 00 111 | 7 | ثـ ـثـ ـث | 7 |
| 8 | I | 00 110 | 8 | بـ ـبـ ب | 8 |
| 9 | O | 11 000 | 9 | تـ ـتـ ـت | 9 |
| 0 | P | 10 110 | 0 | أ | 10 |
| – | A | 00 011 | – | صـ ص | 11 |
| ' | S | 00 101 | X | ك | 12 |
| ✠ | D | 01 001 | ✠ | قـ ق | 13 |
| $ | F | 01 101 | ـة ة | فـ ف | 14 |
| & | G | 11 010 | ~ | ء ـعـ ـع ع | 15 |
| # | H | 10 100 | ء | کـ ك | 16 |
| 🔔 | J | 01 011 | 🔔 جرس | هـ ـهـ ـه ه | 17 |
| ( | K | 01 111 | س | حـ ح | 18 |
| ) | L | 10 010 | رر | جـ ج | 19 |
| ← | ← | 01 000 | → | → | 20 |
| ↑ | ↑ | 11 011 | ↑ | ↑ | 21 |
| + | Z | 10 001 | + | شـ ش | 22 |
| / | X | 11 101 | | سـ س | 23 |
| : | C | 01 110 | ى ى | يـ ـيـ ى ي | 24 |
| . = | V | 11 110 | = | الـ ال | 25 |
| ? | B | 11 001 | ؟ | ـا | 26 |
| , | N | 01 100 | ، | نـ ـنـ ن | 27 |
| . | M | 11 100 | و | مـ م | 28 |
| ↓ | ↓ | 11 111 | ↓ | ↓ | 29 |
| ≡ | ≡ | 00 101 | ≡ | ≡ | 30 |
| | | 00 000 | : | . | 31 |
| → | → | 00 100 | ← | ← | 32 |
| | | | | ( خـ خ ) | 33 |
| | | | | ( ز ) | 34 |
| | | | | غـ ـغـ ـغ غ | 35 |
| | | | | ( ذ ) | 36 |
| | | | | ( ظ ) | 37 |
| | | | | ( ضـ ض ) | 38 |

✠ WHO ARE YOU
🔔 BELL
≡ LINE FEED
→ RETURN CARRIAGE OR TYPING CYLINDER
↑ UPPER CASE
↓ LOWER CASE

FIG. 9a ظ، ض، ذ، ز، خ، غ

FIG. 9b ط، ص، د، ر، ح، ع

METHOD AND SYSTEM FOR 5-BIT ENCODING OF COMPLETE ARABIC-FARSI LANGUAGES

BACKGROUND OF THE INVENTION

1. Field of Invention

This invention relates to a method and devices to be used in Arabic-Farsi teleprinters, typewriters, typesetting control, computer input/output terminals, and displays. In addition the devices and method may be applied to similar terminals which may combine Arabic with other languages.

2. State of the Prior Art

Arabic scripts used for languages such as Arabic, Persian and Urdu (Arabic-Farsi languages) generally contain many more characters and character forms than are found in Roman script used for English, French, etc. Accordingly, coding techniques developed for transmitting, receiving, typesetting, and the like in connection with languages based upon Roman scripts may not be directly applicable for use in encoding and decoding of languages employing Arabic scripts.

A prime example of a coding technique that is used for transmission of the English language is the 5-bit Baudot code used in teleprinting throughout the world on the International exchange system. This 5-bit code can accommodate Roman script since only 26 letters or characters are involved and all 26 letters plus 10 numbers and various punctuations, symbols and functional keys can be accommodated by the Baudot code. On the contrary, it has been thought that the 5-bit Baudot code cannot accommodate the 60 or more characters and character forms that might be required to provide for the transmission of good quality Arabic-Farsi languages by teleprinter. Accordingly, various compromises have been suggested as well as various coding techniques that require more than 5 bits and thus are not compatible with the existing International exchange requirements.

One solution offered by M. S. Chaudhry in U.S. Pat. No. 3,998,310 does not take into consideration the requirements for numerals, arithmetic signs, punctuation, and diacritical marks and also expands coding requirements so as to be incompatible with existing teleprinter systems. Chaudhry reduces the number of letters on a keyboard by dividing Arabic letters into two forms, short form and full form, ignoring the other forms described hereinafter. Characters having both full and short forms are stored in short form when followed by another character and in full form when followed by space. Chaudhry also expands the coding requirements by using a 6-bit code with a seventh bit for "checking". Although it is suggested that other codes may be used, there is no disclosure of a system that provides for transmission and reception of complete Arabic-Farsi languages over standard teleprinter systems.

Hanson U.S. Pat. No. 3,513,968 discloses a typesetting control system in which 6-bit signals representing Arabic characters and space units are stored in a first shift register and successively decoded to classify the data into one of three classes for storage in a second shift register. A second decoder determines the form of the character from the character classification immediately preceding and following the given character. The latter information, and the character form are used to address a memory to select a character in its desired form.

Hyder U.S. Pat. No. 3,938,099 discloses a printing system in which Arabic characters are coded using 8 bits and 11 bits. An analyzer is provided to analyze the concatenation properties applicable to each character using Boolean equations based on knowledge of the variables of the preceding and following characters. This information from the analyzer combined with the character representation code and the composite code is then converted into a code suitable for driving output means.

Other approaches have been undertaken to reduce the number of required characters on machines such as teleprinters by omitting some Arabic character forms and deleting the arithmetic signs and punctuation marks so that the remaining number of characters and operations can be coded in the standard 5-bit binary Baudot coding. Another approach has been to use the English (i.e. Latin or Roman) alphabet to transmit Arabic on English teleprinters.

None of the above approaches solves the problem of transmitting good quality Arabic plus the numerals, arithmetic signs, etc. over the International exchange networks which use Telex and Gentex Exchange systems and utilize standardized 5-bit binary Baudot coding. The elimination of characters greatly diminishes the quality of the Arabic language transmission and much of the expression may be lost or at least may be difficult to read. To achieve desired quality levels by past approaches have required many more than 5 binary bits for encoding the Arabic characters. As a result, considerably more computer storage is required when Arabic script rather than Roman script languages are used in conjunction with computer systems. Furthermore the transmission energy requirement of a given message is reduced as the number of bits per character is reduced so such reduction is very desirable.

BRIEF SUMMARY AND OBJECTS OF THE INVENTION

It is accordingly an object of the present invention to provide a novel method and system that overcomes the foregoing problems of the prior art.

It is another object of the present invention to provide a novel method and system for high quality reproduction of languages that use Arabic characters wherein digital encoding and decoding is employed and each character is represented by and may be transmitted using no more than 5 binary bits.

It is yet another object of the present invention to provide a novel method and system for teleprinting Arabic-Farsi languages using existing International exchange networks including Telex and Gentex Exchange systems with a minimum of additional equipment and no change in the codes now employed.

The apparatus and the method according to this invention enable the user to transmit and receive up to four forms per letter of the Arabic-Farsi languages plus the numerals 0-9, various teleprinter commands, the basic arithmetical signs, and a selected number of punctuation and diacritical marks. The transmitted and received code uses the standardized 5-bit binary Baudot coding. Hence the International Telex, and Gentex networks may be used to transmit complete Arabic-Farsi texts without compromising the quality of the language. Savings are obtained in the required number of code words and bits for the message and in computer storage requirements for the Arabic-Farsi texts.

In accordance with a preferred invention, various characteristics of Arabic-Farsi languages are used to provide for the complete reproduction of all Arabic characters as well as required numerals, punctuation marks, etc. required for complete teleprinting of Arabic-Farsi languages using standard 5-bit coding. The language characteristics used include:

1. Although there may be more than 60 characters and character forms (or variations) in the Arabic-Farsi languages, there are 28 basic letters or characters in the Arabic Farsi languages, some of these characters take different forms depending on the character preceding it and the character following it and the used calligraphy style. Hence only one code word for each Arabic character is required to be transmitted if a logic is implemented at the receiver printer or display to select the required form and command the printer or output display, or device accordingly.

2. The six Arabic letters in FIG. 9A are the same as the letters as those in FIG. 9B respectively with the exception of the dot above each letter in the first group. Hence each letter in the first group can be recognized if a code is received for the dot followed by a code for the corresponding letter. Thus the required code words can further be reduced by five words.

3. Arabic letters, numerals, punctuation marks, arithmetical signs, diacritical marks including the dot above selected letters, and teleprinter operational commands can be classified into the following types:

Type A: Those characters that join to the following character in a given word and join to the preceding character.

Type B: Those characters that do not join to the following letter in a given word but join the preceding character.

Type C: Those characters that do not join to the preceding or to the following characters. These include numerals, arithmetical signs, and punctuation marks, Type D: Those characters that do not cause the carriage or printing cylinder, or display to move to the next space such as diacritical marks, and the upper case and lower case signals.

Type O: Those teleprinter operational commands such as "Who are you?", Here is, Bell, Carriage return, and Line feed.

4. The diacritical marks, fall above or below the corresponding letter the same as the dot above the letters. When diacritical marks are printed they do not cause the carriage feed or the printing cylinder, or ball or CRT display to advance to the next space and do not affect the choice of the letter form. Also the transmission of the teleprinter commands such as change from upper to lower case and vice-versa are not printed and do not cause carriage feed, or display space movement.

Using the above characteristics, this invention provides apparatus and a method to code the complete Arabic alphabet, the numerals, the basic arithmetic signs, and the selected punctuations, and diacritical marks, plus the teleprinter operational commands in 5-bit binary Baudot codes. Apparatus is provided to interface with the printer, or display so that all the required Arabic letter forms can be indicated and printed or displayed accordingly.

The foregoing objects and advantages of the invention will become apparent to one skilled in the art to which the invention pertains from the following detailed description when read in conjunction with the appended drawings.

BRIEF DESCRIPTION OF THE DRAWINGS

FIG. 6 is a Table indicating the groups of classification of the Arabic-Farsi characters in the teleprinter or telex operations in order to illustrate the type classification according to the present invention;

FIG. 7 is a Table summarizing the rules for determining the letter form according to the present invention;

FIG. 8 is a Table illustrating an example of Baudot coding of Arabic-Farsi characters in accordance with the present invention; and FIGS. 9A and 9B indicate the two groups of Arabic-Farsi characters that are similar except for a dot above each character in one group which does not appear in the other.

DETAILED DESCRIPTION OF A PREFERRED EMBODIMENT

Arabic letters or characters are basically 28 in number ( with the letter لا usually viewed as a 29th letter) but some letters may have as many as four different forms depending upon their position in relation to other characters. As indicated in FIG. 8, there are characters which may take four forms while others may take three forms, others two forms and others only one form. The form of the character is decided upon in accordance with the logic and classifications set forth in FIGS. 6 and 7.

In accordance with the preferred embodiment of the invention, Arabic letters, numerals, arithmetic signs, punctuations, diacritic marks (including the dot above selected letters), and the teleprinter operational commands are classified into the five types of teleprinter characters A, B, C, D and O previously defined and illustrated in FIG. 6.

The Arabic-Farsi letter forms may be one of four possibilities: the start form, the middle form, the end form, and the independent form. The form of a letter is logically determined in the preferred embodiment according to the rules in FIG. 7 where the (+) sign means "or".

Figure 1:
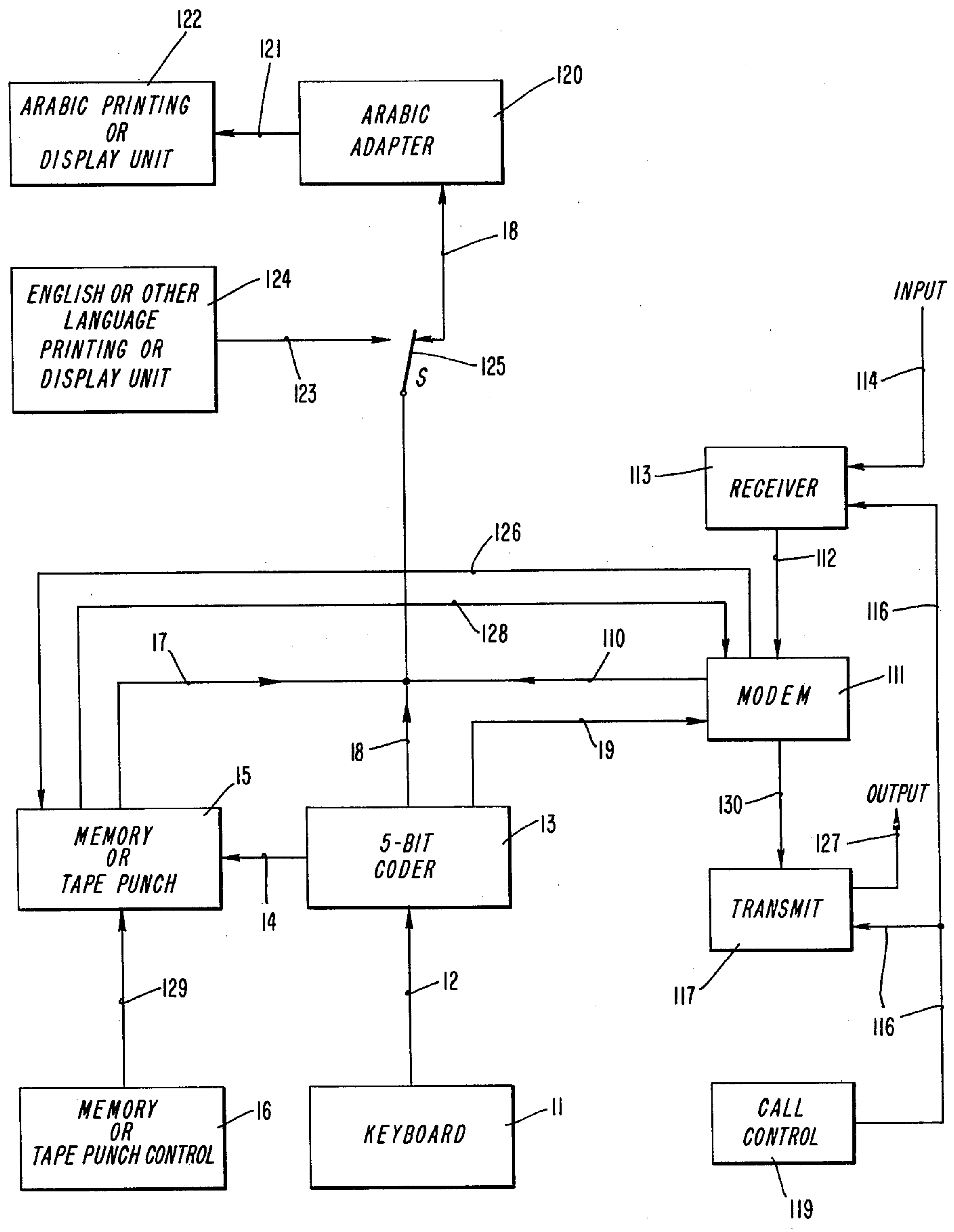
FIG. 1 is a functional block diagram of a teleprinter system operable in accordance with the present invention to transmit and receive Arabic-Farsi languages using standard 5-bit codes.

FIG. 1 illustrates a teleprinter system in accordance with the present invention which utilizes the foregoing criteria to transmit and receive Arabic-Farsi languages using standard 5-bit coding techniques. Referring to FIG. 1, a keyboard 11 is connected by a line 12 to a conventional 5-bit Baudot coder 13. The keyboard 11 may be a standard English keyboard arranged with the Arabic letters, the numerals, the arithmetic signs and the selected punctuations and diacritical marks plus the teleprinter commands as shown in FIG. 8 hereinafter by way of example. The coder 13 codes the characters into 5-bit binary Baudot codes. FIG. 8 also provides an example of a Baudot 5-bit binary coding arrangements for the keyboard characters.

The 5-bit coder 13 is connected by a line 14 to a conventional memory or tape punch 15 which is controlled by a suitable memory or tape punch control 16 by way of line 129. The 5-bit coder 13 is also connected to a conventional modem 111 by a line 19 and the modem 111 is connected to a conventional transmitter 117 and to a conventional receiver 113. The transmitter and receiver are controlled by a conventional call control circuit 119 by a line 116 as illustrated.

The modem 111 and the memory or tape punch 15 are interconnected as schematically indicated by the lines 126 and 128. The memory or tape punch 15, the 5-bit coder 13 and the modem 111 are also connected as is schematically illustrated by the respective lines 17, 18 and 110 to a switch 125. The switch 125 selectively connects the three units 13, 15 and 111 either to a conventional English or other language printing or display unit 124 or to an Arabic adapter 120 hereinafter described in greater detail. The Arabic adapter 120 is connected to an Arabic printing or display unit 122 such as a conventional CRT display or a conventional Arabic typewriter.

The keyboard 11, the 5-bit coder 13, the memory or tape punch 15, the memory or tape punch control 16, the modem 111, the receiver 113, the transmitter 117 and the call control 119, as well as the English or other language printing or display unit 124 together make up a standard teleprinter unit of the type commerically available for English language or other Roman character based language transmission. The one difference in this system is that the keyboard 11 is provided with Arabic letters, numerals, arithmetic signs and selected punctuations and diacritical marks, as well as the teleprinter commands shown, for example, in FIG. 8. Moreover, the switch 125 would ordinarily be unnecessary in a one language system.

The teleprinter of FIG. 1 may operate in a transmit or receive mode, or in a purely local mode in which mode data is neither transmitted nor received. In local mode, the transmitter 117 is disabled so that data entered by way of the keyboard 11 is not transmitted. The data is, however, coded by the 5-bit coder 13 to form 5-bit Baudot codes. These 5-bit codes are supplied either to the printing or display unit 124 or the Arabic adapter 120 depending upon the position of the switch 125.

Assuming that the system is set up for Arabic operation and the user is using the Arabic characters on the keyboard 11, the switch 125 will be in the position illustrated. The keys depressed on the keyboard 11 result in a 5-bit code for each depressed key and this 5-bit code is supplied to the Arabic adapter 120. The Arabic adapter translates the 5-bit codes into 8-bit codes by adding 2 bits to indicate the proper form of the character and 1 bit to indicate whether the character is upper or lower case. The additional 2 bits indicating the form of the character are arrived at by utilizing the previously described characteristics of the Arabic-Farsi languages.

If the teleprinter is operating in the receive mode with the switch in the illustrated position, the data received on input lead 114 by the receiver 113 is supplied by the modem 111 to the memory or tape punch 15 and the Arabic adapter 120. Depending upon the state of the memory or tape punch control 16 the incoming data may be stored by the memory or tape punch 15 in a conventional manner. The data supplied to the Arabic adapter 120 is translated into the 8-bit signal previously described and causes the printing or display unit 122 to reproduce the proper Arabic characters.

If the teleprinter of FIG. 1 is operating in the transmit mode with the switch 125 in the illustrated Arabic position, the transmitter 117 is enabled and the 5-bit codes from the coder 13 are supplied both to the Arabic adapter and through the modem 111 to the transmitter 117. The modem may alternatively receive 5-bit codes from the memory or tape punch 15 by a line 128 as in typical conventional teleprinter systems. FIG. 8 provides an example of 5-bit binary Baudot coding of Arabic as compared to English character coding on a standard teleprinter keyboard. The codes are 32 in number but many more than 32 characters can be encoded because the keys can be operated either in upper or lower case. Also, the characters listed in slots 33–38 do not have separate codes but are made up of a composite of the dot code (00000) followed by the corresponding character code. It will be appreciated from FIG. 8 that all of the Arabic characters and character forms are provided on the keyboard in addition to the numerals, the arithmetic signs, the selected punctuations and diacritical marks, and the teleprinter commands of a standard teleprinter. The code for the characters listed as 33–38 may thus be formed by first depressing the key (and thus generating the code) for the dot and then depressing the key for the character or by depressing only one key and automatically generating both codes as is described hereinafter.

It can be seen from FIG. 8 that those characters having more than one form are provided only one key position on the keyboard and one corresponding 5-bit code. Thus, one 5-bit code represents a character that may have up to four forms with nothing in the 5-bit code itself to indicate the form of the characters. The receiving end of the system (i.e. a remote receiver or a local printer) must therefore determine the form of the character from the foregoing criteria.

Figure 5:
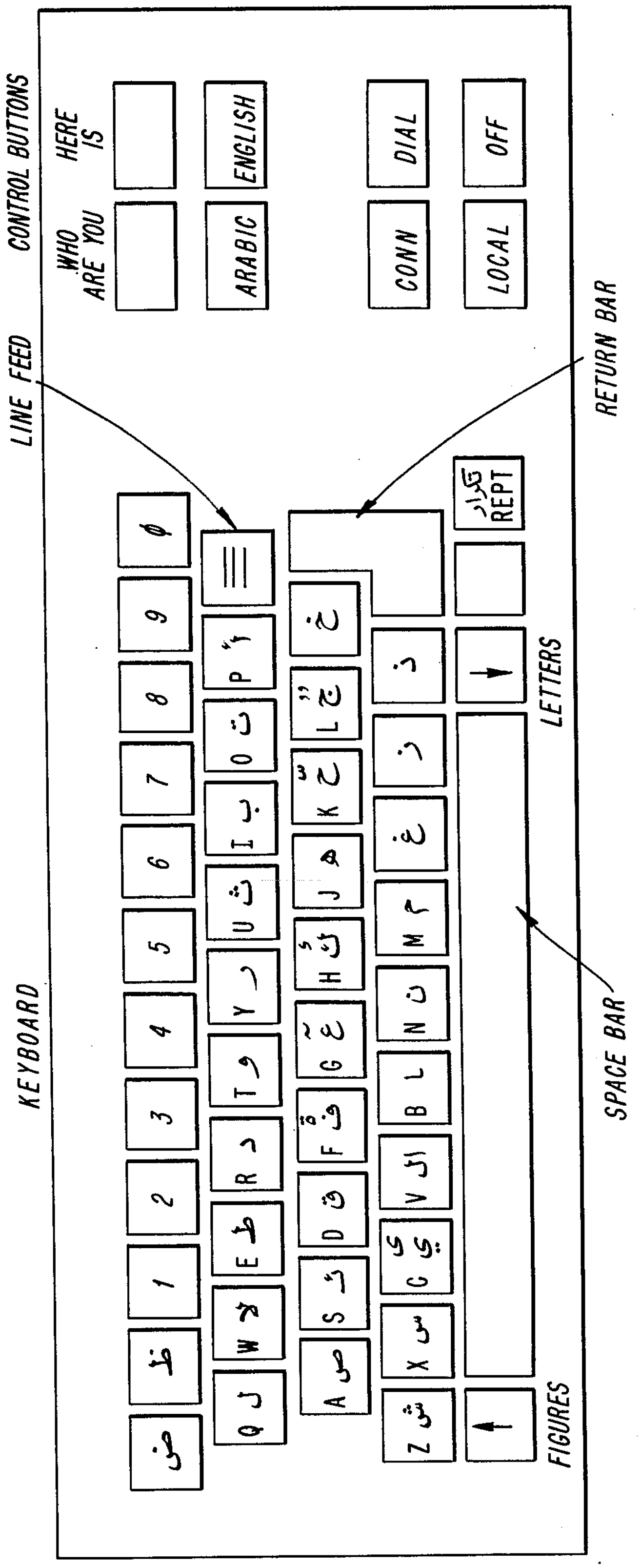

The Arabic character in the lower case keyboard position labelled No. 1 in FIG. 8, for example, corresponds to the first English Q (see FIG. 5 for example). The Arabic character in the Table illustrated in FIG. 8 and the English Q are therefore encoded with the same code, i.e. 10111. Accordingly, if the Arabic character in the number one position in the Table of FIG. 8 is depressed on the keyboard of FIGS. 1 and 5, the coder 13 will produce the 10111 code. If the switch 125 is in the illustrated position, one of the two forms of letter number one in FIG. 8 will be reproduced depending on the position of the character relative to other characters. Similarly, if the switch 125 is in the position connecting the coder to the printing or display unit 124, the letter Q will be printed. It will therefore be appreciated that the Arabic adapter 120 makes the decision based upon the previously described criteria as to what Arabic character form will be printed despite the fact that the 5-bit code carries no information as to the forms of the character.

Figure 2:
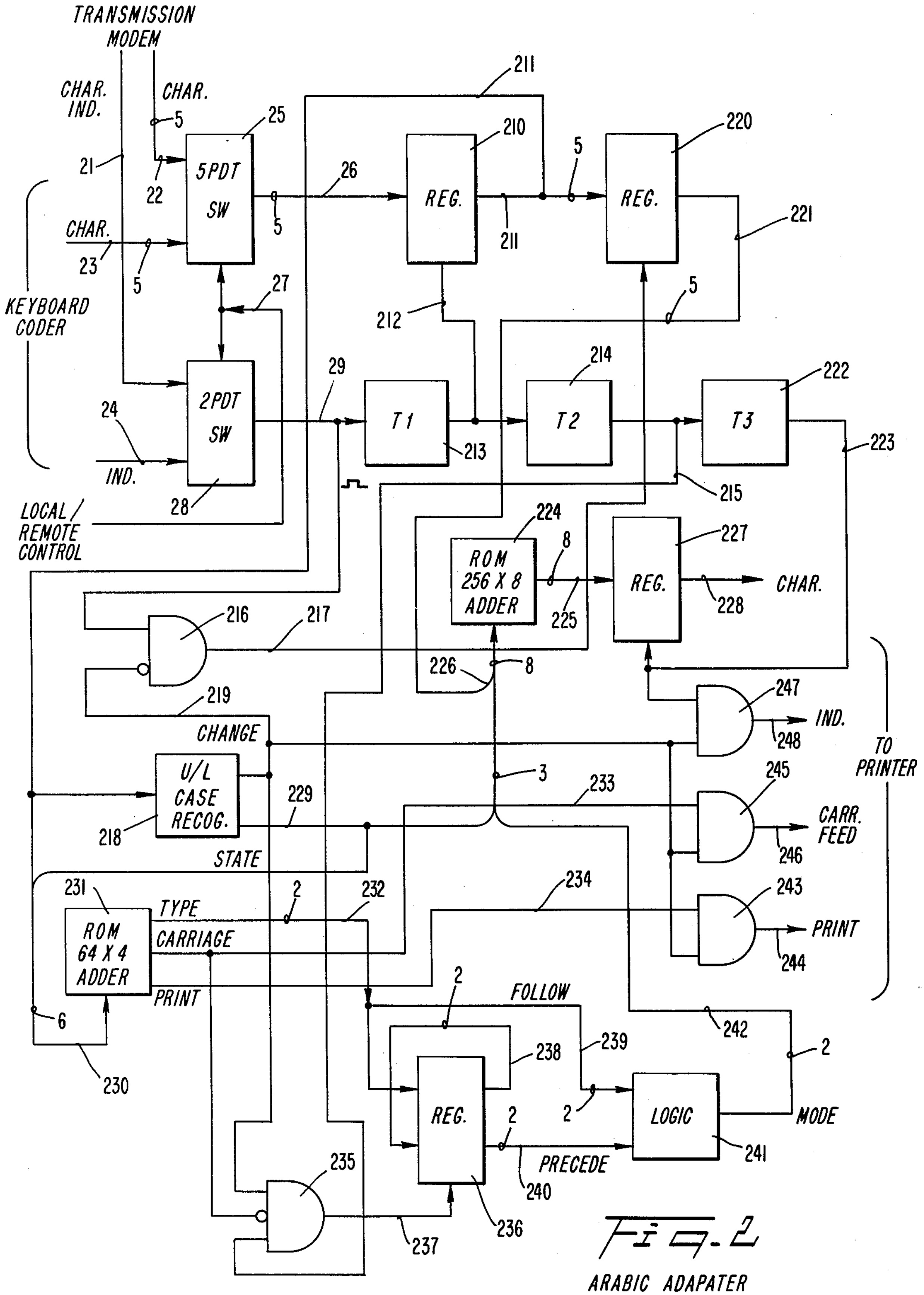
FIG. 2 is a functional block diagram illustrating the Arabic adapter circuit of FIG. 1 in greater detail.

One embodiment of the Arabic adapter 120 of FIG. 1 is illustrated in greater detail in FIG. 2. Referring now to FIG. 2, it will be seen that the Arabic adapter provides for the utilization of the standard 5-bit Baudot code in the transmission and reception of Arabic-Farsi languages and provides the ability to print all Arabic characters in their exact forms at the receiving end of the transmission system. It will also be appreciated that the technique used to accomplish this result in the circuit of FIG. 2 includes (A) identification of a sequence of characters as upper or lower case, (b) identification of each character by type including whether this character is printed with or without carriage feed and whether carriage feed occurs without printing, and (C) utilization of the information of (A) and (B) above in conjunction with delay so that a form for each character is identified at the time of printing. It will be seen that because of the delay the printed character is, in general, one character behind the last character received.

Referring now to FIG. 2, the Arabic adapter includes two position selector switches 25 and 28 which select coded character information (a strobe signal IND that acts as a timing signal for the received information) and character indicator information, respectively, from either a local keyboard or memory, or from a transmission system. For example, in one position of the switches 25 and 28, a 5-bit Baudot code and a valid character indicator signal (the strobe) will be accepted from the transmission system modem 111 of FIG. 1. In the other position of the switches 25 and 28, the character and character indicator code will be accepted from the keyboard coder 13 of FIG. 1.

The selected character is supplied as a 5-bit signal along line 26 to a conventional 5-bit parallel in/parallel out shift register 210. The output signal from the register 210 is supplied to a second identical shift register 220, to an upper and lower case recognizing circuit 218 and to the address input terminal of a read only memory (ROM) 231.

The valid character indicator signal selected by the switch 28 is supplied along line 29 to a conventional delay circuit 213 such as a flip flop and to one input terminal of a gate 216. The output signal from the delay circuit 213 is applied over line 212 to the shift input terminal of the register 210 and to a second conventional delay circuit 214. The signal from the second delay circuit 214 is supplied to a third conventional delay circuit 222 and to one input terminal of a conventional three input terminal logic gate 235. The output signal from the delay circuit 222 is supplied to the clock input terminal of a register 227 and to one input terminal of a logic gate 247.

The change output signal from the upper and lower case recognizer 218 indicating that a change from upper to lower case or vice-versa has occurred is supplied to one input terminal of the gate 235, to an inverting (negative logic) input terminal of the gate 216, and to one input terminal of each of three conventional logic gates 243, 245 and 247 (e.g. AND gates). The output signal from the logic gate 216 is supplied along line 217 to the clock or shift input terminal of the register 220. The output signals from the logic gates 243, 245 and 247 are supplied to the printer 122 of FIG. 1 as the respective indicator (IND), carriage feed (CARRFEED) and print (PRINT) signals. The read only memory 224 receives an 8-bit address signal (the delayed character plus the upper/lower case STATE plus a 2 bit signal MODE specifying the character form) and supplies an 8-bit character code to a conventional 8-bit register 227. The output signal CHAR from the register 227 is the code identifying which character form is to be printed.

The read only memory 231 receives 6-bits of information, including the last received 5-bit character code and the current upper/lowr case STATE, and provides four bits of information specifying the type of character received (TYPE), whether or not the carriage should be moved (CARRIAGE) and whether or not the character should be printed (PRINT). The TYPE signal is a 2-bit code supplied to both a register 236 and a logic circuit 241. The type of character may be type A, B, C, or O as was previously described (type D being excluded since it is a noncarriage character). The CARRIAGE signal is a 1-bit signal specifying whether or not a movement of the carriage is specified by the current character. The PRINT signal is a 1-bit signal specifying whether or not the character is to be printed (e.g. type O characters will not be printed).

The TYPE signal is applied over line 232 to the data input terminals of two stages of a conventional four bit parallel in/parallel out shift register 236. The output signals from the first two stages are applied via line 238 to the input terminals of the other two stages of the register 236, and the output signals from these latter two stages are applied as the PRECEDE signal to a conventional logic circuit 241. The TYPE signal is supplied to two other input terminals of the logic circuit 241 as the FOLLOW signal. The logic circuit 241 may be any conventional logic circuit (e.g. a plurality of AND, OR, NAND or NOR gates) connected in a conventional manner to solve the equations of Table II. The resulting Mode signal thereby indicates by 2 bits one of the four possible forms previously discussed.

In operation, switches 25 and 28 enable selection of the 5-bit Baudot characters plus a valid character indicator from either a local keyboard or from a transmission system. The transmission system will be of the standard 5-bit Baudot type.

The character indicator pulse is conventionally provided in a teleprinter system to indicate the presence of a character. This pulse is delayed by the respective delay circuits 213, 214, and 222 to provide for a controlled order of sequence of events described below.

The upper/lower case recognizer 218 examines the last received character in register 210 and provides two output signals. The current state output signal STATE indicates that all characters are either upper or lower case depending upon the binary state so indicated and until the state is changed. For example, a binary ONE on line 229 might indicate upper case while a ZERO might indicate lower case. The CHANGE signal on 219 indicates a state change when the last received character was an upper or lower case indicator character. If the last received character was an upper or lower case indicator (i.e. the character indicating the upper or lower case key as shown in FIG. 8 has been depressed) then the only activity on the next character is the change of the state 229 and loading of register 210, while the CHANGE signal on lead 219 inhibits gate 216 and prohibits loading of register 220.

If the last received character is not an upper or lower case indicator, then the next received character indicator pulse on lead 29 is passed by gate 216 and causes the previous character in register 210 to be transferred to register 220.

Next, after the delay $T_1$ the latest character received over line 26 is stored in register 210 in response to the delayed pulse from circuit 213. This latest 5-bit character along with the 1-bit STATE signal produces a 6-bit address for the read only memory (ROM) 231. This ROM stores a 4-bit word for each address. Two bits identify the form as O, A, B OR C as indicated in FIG.

7, one bit indicates if carriage feed is associated with this character and one bit indicates if printing is associated with the character. For example, a space does not involve printing while adding a dot or diacritical mark to a character involves printing but does not involve carriage feed.

Next, after additional delay $T_2$, the TYPE data in register 236 is advanced by the signal from logic gate 235. If the character in register 210 is an upper or lower case indicator, or if carriage feed is not associated with this character including the U/L case state as indicated by the CARRIAGE signal on line 233, then the data in register 236 is not advanced. When the data is advanced then the 2 binary bits of the TYPE signal are stored in register 236 and appear on leads 238 while the previous data on leads 238 is simultaneously advanced to appear on leads 240 of register 236. The resulting 4-bits applied from the register 236 to logic element 241 produces a MODE output signal. The MODE output identifies the character form as being either of the start, middle end or independent form as indicated in FIG. 7. The 5-bit character code from register 220 together with the character form signal MODE and the upper/lower case state signal thus form an address that selects the indicator for the proper character form from the appropriate memory location ROM 224 for printing.

The final operations are the loading of register 227 after an additional delay $T_3$ and an outputting of a character indicator to the printer via lead 248. If the last received character was an upper or lower case indicator then the character indicator signal IND, carriage feed signal CARRFEED, and print commands PRINT to the printer are all inhibited. Depending upon the type of printer being used, the independent carriage feed and print commands may not be necessary since this information is also inherently contained in the 8-bit character 228 being fed to the printer.

The final selection of up to a 8-bit (some systems may require only 7-bits) character data for the printer is accomplished in ROM 224. The 8-bit address to this ROM is composed of 5-bits 221 of the originally received Baudot character, one on bit 229 indicating upper or lower case, and 2-bits 242 indicating mode as was previously described.

As was previously mentioned, there are six Arabic letters or characters that are formed identically to six other but quite different characters except that the latter six include a dot over the character. With the keyboard discussed in connection with FIG. 8 it was suggested that these letters with dots could be encoded for subsequent decoding by providing a "dot" key on the keyboard, which key could be depressed before depressing any of the non-dotted characters already on the keyboard to transform these to the "dot" characters. As an alternative, the character with the dot itself can be placed on the keyboard as shown in FIG. 4 and a circuit such as that shown in FIG. 3 can be used to automatically generate the dot code plus the code of the corresponding characters whenever these keyboard characters are depressed. It will, of course, be appreciated that this requires no additional code words but merely simplifies the operation of the keyboard.

Figure 3:
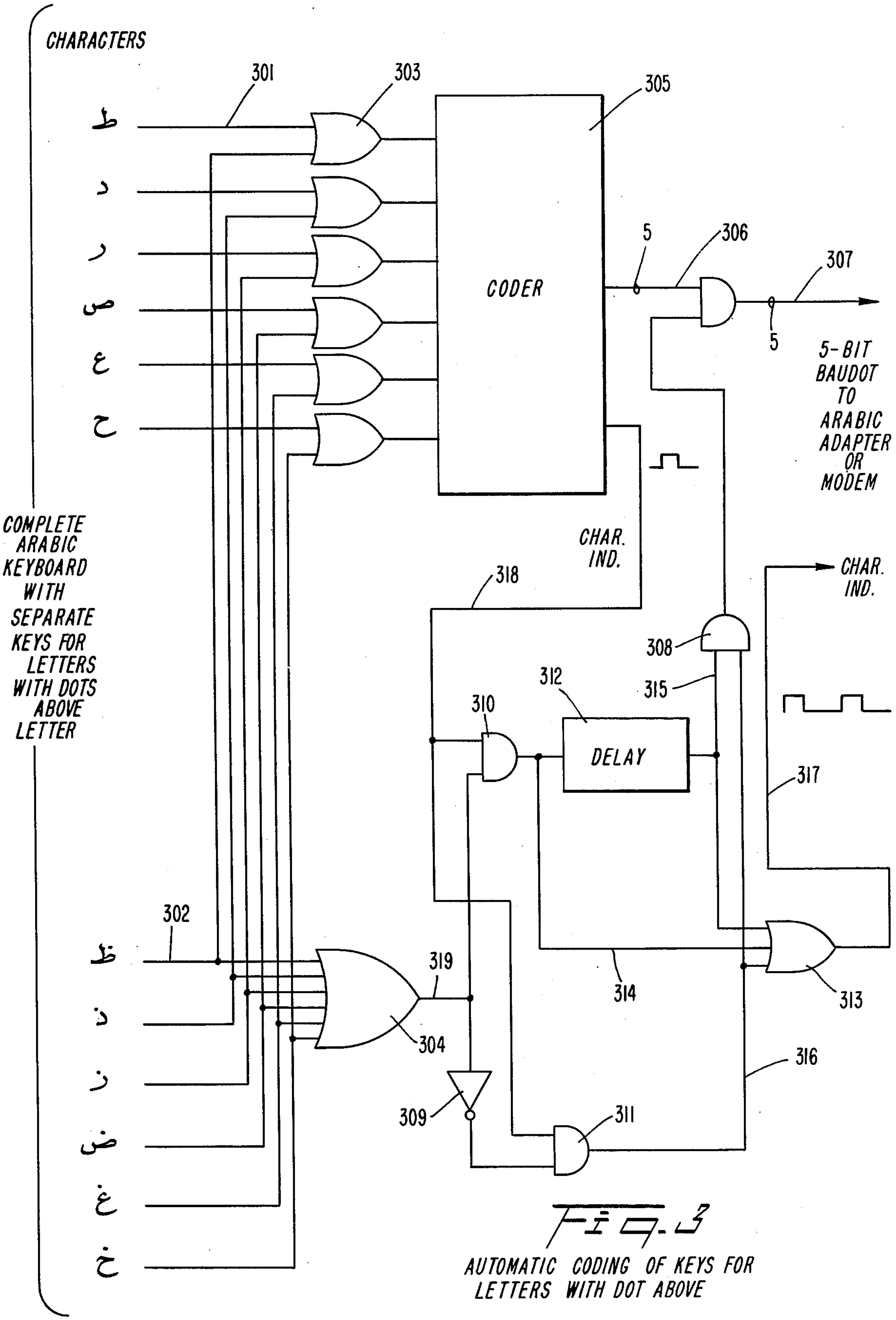
FIG. 3 is a functional block diagram illustrating in greater detail a coder that automatically causes the generation of a dot code and a character code when certain characters are commanded by a user.
Figure 4:
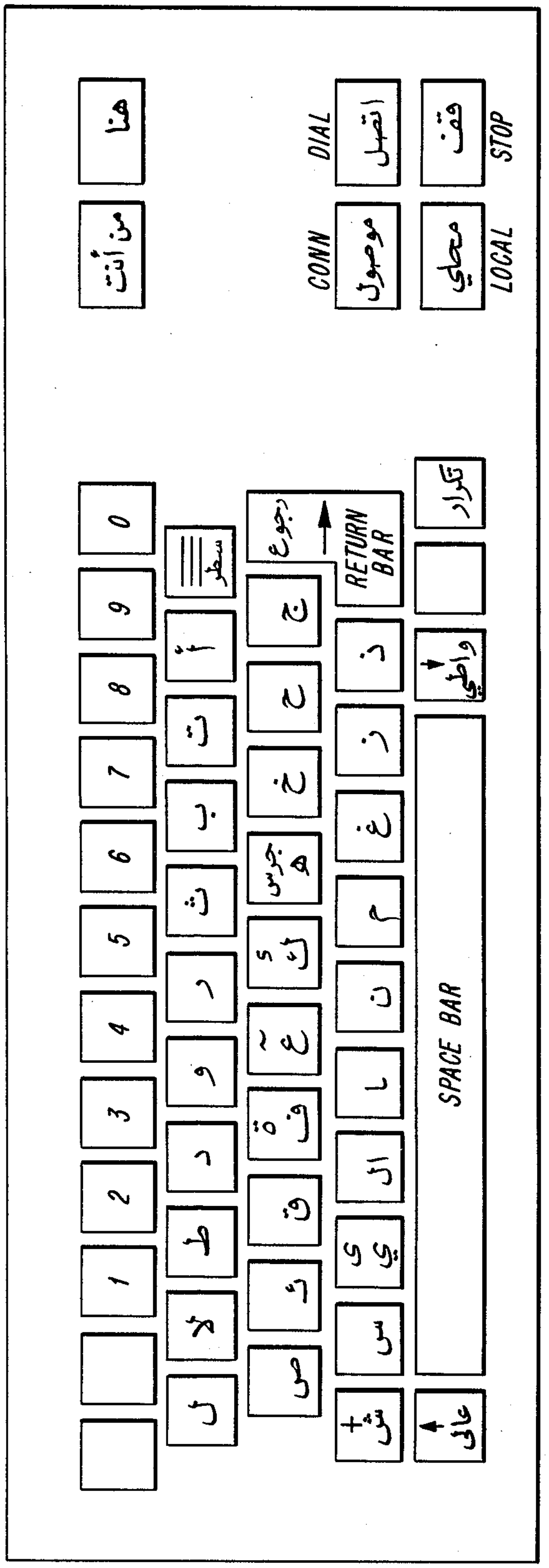
FIG. 4 is a pictorial representation of one form of teleprinter keyboard that may be utilized in conjunction with the present invention for transmission and reception of Arabic; and, FIG. 5 is a pictorial representation of a variation of the keyboard of FIG. 4 with the English (Roman) characters also appearing on the keys as they are shown in Table III herein.

FIG. 3 illustrates a circuit that causes the transmission of a dot code (00000) followed by the code of the corresponding letter when any of the letters with the dot above is selected. For example if the third character from the left in FIG. 9A is selected two character codes will be transmitted; namely (00000) for the dot followed by (10101) for the character that corresponds to the dotted character (the third character from the left in FIG. 9B).

The six input characters, the first of which is identified by the numeral 301, are the six Arabic letters without the dot and they are processed in the 5-bit keyboard coder 305 as previously described. The same six letter forms (except for having the dot) are identified by the number 302. Through six OR gates 303 each letter activation on the keyboard of one of the six letters with or without the dot enters the coder 305 identically. In addition a six input terminal OR gate 304 provides an output signal on lead 319 in response to the entry of one of the six "dotted" letters. The character indicator pulse on line 313 from the coder 305 is combined through AND gates 310 and 311 with the signal from the OR gate 304 and its inverted form, respectively. The signals from the AND gates 310 and 311 and the signal from the coder 305 are then used with a conventional delay circuit 312, OR gate 308, AND gate 306, and OR gate 313 to produce the following responses and outputs.

If a key 301 for the letter without the dot is activated then the AND gate 306 is enabled to cause the 5-bit character to appear at the output terminal 307 during the occurance of a single character indicator on lead 317.

If a key 302 for a letter with a dot is activated, then two sequential character indicator pulses occur on output lead 317 separated by the time delay 312 which will be in the order of 10 to 30 milliseconds to enable separation but to prevent operator activation of another key before the double character out is completed. During the first character indicator pulse CHAR IND, the AND gate 306 is disabled so that the output on lead 307 is the all ZERO code for the dot. During the second character indicator pulse, the OR gate 308 is enabled so that the code for the character without the dot 301 which is on lead 306 out of the coder now appears at the output 307.

The present invention may be embodied in other specific forms without departing from the spirit or essential characteristics thereof. It should be understood, for example, that the present invention is readily usable for the storage and retrieval of information as shown in FIG. 1 merely by operating in local mode and recording or storing information in memory 15 as it is keyed in through the keyboard 11. When it is desired to use the information, it can be retrieved and applied through the Arabic adapter for display. The presently disclosed exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A teleprinter system for Arabic-Farsi languages comprising:

means for generating a succession of 5-bit codes each representing an Arabic character of the Arabic-Farsi language or one of a plurality of standard teleprinter characters including teleprinter numerals, punctuation, and command characters, without regard to the form of the Arabic characters;

means for inserting one of at least three 5-bit codes into the succession of 5-bit character codes to identify at least one subsequent character code as being in one of at least three predetermined groups of characters associated with the inserted one of the three 5-bit codes;

means for receiving and storing the 5-bit code for at least two successive characters;

means responsive to the stored 5-bit codes for classifying each received character as one of a plurality of predetermined character types;

means for generating a second code identifying each stored 5-bit code representing an Arabic character as one of four possible Arabic character forms in response to the classified type of the character immediately preceding and immediately following the first stored of the characters;

means for displaying in its proper form and position each Arabic character represented by a stored 5-bit code in response to said second code and the stored 5-bit code, including means for displaying successive characters in the same position in response to an indication from the classifying means that a character to be displayed is of a character type for which the display position is not to change.

2. The teleprinter system of claim 1 wherein said classifying means comprises means for specifying each received character as a character of the type that joins to the preceding or following character in a given word, a character of the type that does not join the following character in a given word but does join the preceding character, a character of the type that does not join either the preceding or following character, a character of the type that does not cause the movement of the display to another space, or a character of the type that specifies a teleprinter operation command.

3. The teleprinter system of claim 1 wherein the six Arabic letters (with dots as shown in FIG. 9*a*) are coded as a 5-bit code specifying a dot followed by a 5-bit code specifying the corresponding one of the forms (without the dots as shown in FIG. 9*b*).

4. The teleprinter system of claim 3 wherein said classifying means comprises means for specifying each received character as a character of the type that joins to the preceding or following character in a given word, a character of the type that does not join the following character in a given word but does join the preceding character, a character of the type that does not join either the preceding or following characters, a character of the type that does not cause the movement of the display to another space, or a character of the type that specifies a teleprinter operation command.

5. The teleprinter system of claim 4 wherein said displaying means comprises means for generating an 8-bit code specifying the stored 5-bit code as one of a plurality of possible characters including all Arabic characters and forms thereof, standard teleprinter operation commands, punctuation, numerals and diacritical marks, wherein the possible characters and character forms number over one hundred.

6. The teleprinter system of claim 1 wherein said displaying means comprises means for generating an 8-bit code specifying the stored 5-bit code as one of a plurality of possible characters including all Arabic characters and forms thereof, standard teleprinter operation commands, punctuation, numerals and diacritical marks, wherein the possible characters and character forms number over one hundred.

7. An adapter for effecting the decoding of Arabic-Farsi languages that have been encoded as a succession of Arabic characters together with other characters including numerals, arithmetic signs, punctuation, operation commands and diacritical marks as a sequence of 5-bit digital character codes without regard to the form of the Arabic characters of the language comprising:

means for inserting one of at least three 5-bit codes into the sequence of 5-bit digital character codes to identify at least one subsequent character code as being in one of at least three predetermined groups of characters associated with the inserted one of the three 5-bit codes;

means for momentarily storing each 5-bit digital character code in a sequence that forms the Arabic-Farsi language;

means responsive to the stored 5-bit digital character code for classifying each character as one of a plurality of predetermined character types as a function of the 5-bit digital character code preceding and following the stored 5-bit digital character code in said sequence;

means responsive to said classifying means for generating a second digital code specifying the form of each Arabic character represented by the stored 5-bit digital character code; and, means for generating a third digital code of greater than 5-bits specifying the character represented by the stored 5-bit digital character code, including the form of said character specified by said second digital code, in response to said stored 5-bit digital character code, said second digital signal and said inserted one of the at least three 5-bit codes.

8. A method of teleprinting Arabic-Farsi languages comprising the steps of:

generating a succession of 5-bit character codes wherein each 5-bit character code represents an Arabic character of the language or one of a plurality of characters including punctuation, numerals, commands, and diacritical marks, the 5-bit code of each Arabic character representing the character without regard to its form;

inserting one of at least three 5-bit codes into the succession of 5-bit character codes to identify at least one subsequent character code as being in one of at least three predetermined groups of characters associated with the inserted one of the at least three character codes;

transmitting the succession of 5-bit character codes and the inserted 5-bit codes to a remote location;

receiving the succession of 5-bit character and inserted codes at the remote location and momentarily storing each received 5-bit code;

classifying the character represented by the stored 5-bit code as one of a plurality of possible character types;

for each 5-bit code representing an Arabic character, generating a form code specifying the form of the Arabic character represented by the 5-bit code as a function of the type of character immediately preceding and following the stored 5-bit character code; and displaying the received succession of 5-bit codes as Arabic characters in their proper forms and positions and as other characters specified by the 5-bit codes in response to both the 5-bit codes and the form codes, successive characters being displayed in the same position in response to an indication that a received character is of a predetermined type for which the display position is not to change.

9. A method of storing and retrieving data in an Arabic-Farsi language wherein the data are represented by a sequence of 5-bit digital words with each word representing a character of the data, the method comprising the steps of:

assigning each character of the data to one of at least three predetermined groups and inserting into the sequence of 5-bit digital words one of at least three 5-bit codes identifying at least one subsequent 5-bit word as being in one of the at least three predetermined groups;

storing the data as a sequence of 5-bit digital words each representing a character of the data, including Arabic characters, without regard to the form of the Arabic characters;

retrieving the 5-bit digital words in sequence from storage and determining the form of each Arabic character represented by a 5-bit word as a function of the identify of the Arabic character and of the 5-bit word preceding and following the Arabic character;

displaying the data including the Arabic characters in their proper forms and positions with some positions being the same for two successive characters in response to the retrieved 5-bit digital words and the determined form of the Arabic character.

* * * * *